(12) United States Patent
Nagatomo et al.

(10) Patent No.: US 9,002,878 B2
(45) Date of Patent: *Apr. 7, 2015

(54) ROADSIDE APPARATUS, CONTROL METHOD AND PROGRAM

(71) Applicant: Kabushiki Kaisha Kenwood, Hachiouji-shi, Tokyo (JP)

(72) Inventors: Hideyuki Nagatomo, Kawasaki (JP); Hiroyuki Suzuki, Sagamihara (JP); Nobuyuki Hotta, Hachiouji (JP); Hideo Shimoshimano, Hachiouji (JP); Takuya Ogura, Hachiouji (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 243 days.

This patent is subject to a terminal disclaimer.

(21) Appl. No.: 13/672,094

(22) Filed: Nov. 8, 2012

(65) Prior Publication Data

US 2013/0132513 A1    May 23, 2013

Related U.S. Application Data

(62) Division of application No. 12/812,085, filed as application No. PCT/JP2009/050193 on Jan. 9, 2009, now Pat. No. 8,316,042.

(30) Foreign Application Priority Data

Jan. 11, 2008 (JP) ................................. 2008-004607
Feb. 21, 2008 (JP) ................................. 2008-040734

(51) Int. Cl.
*G06F 17/30* (2006.01)
*H04L 29/08* (2006.01)
(Continued)

(52) U.S. Cl.
CPC ................ *H04L 67/12* (2013.01); *G06Q 30/02* (2013.01); *G08G 1/0962* (2013.01);
(Continued)

(58) Field of Classification Search
USPC .................................. 707/769, 802; 709/217
See application file for complete search history.

(56) References Cited

U.S. PATENT DOCUMENTS

6,526,335 B1 * 2/2003 Treyz et al. ........................ 701/1
7,590,486 B2 * 9/2009 Okude et al. .................. 701/452
(Continued)

FOREIGN PATENT DOCUMENTS

| JP | 2001-237788 | 8/2001 |
| JP | 2004-310301 | 11/2004 |
| JP | 2005-254986 | 9/2005 |

OTHER PUBLICATIONS

Office Action (JP 2008-004607) dated Oct. 16, 2012.
(Continued)

*Primary Examiner* — Shyue Jiunn Hwa
(74) *Attorney, Agent, or Firm* — Eric J. Robinson; Robinson Intellectual Property Law Office, P.C.

(57) ABSTRACT

A roadside device is provided with a corresponding table where an item of a new version of a taste data table assumed user taste information from an item of an old version of the taste data table. Item numbers "52", "53", "62" and "63" in the old version of the taste table, for example, are made to correspond to item numbers "52", "53" and "63" in the new version of the taste table. An ITS vehicle-mounted device sets user taste data in the updated item numbers to default values of the items in the new version for a transmitting-destination user of the taste data table of the new version and transmits the default data to an ITS vehicle-mounted device of the transmitting-destination user. Thereby, a proper default value is set for a version change of the taste data table in the roadside apparatus, reducing user's input trouble.

7 Claims, 14 Drawing Sheets

| 10 | road-vehicle DSRC system |
| 11 | roadside device |
| 12 | server |
| 13 | vehicle |
| 15 | roadside apparatus |
| 17 | vehicle-mounted device |
| 18 | DSRC unit |
| 19 | navigation unit |

(51) Int. Cl.

| | |
|---|---|
| *G06Q 30/02* | (2012.01) |
| *G08G 1/0962* | (2006.01) |
| *G08G 1/0967* | (2006.01) |
| *H04N 7/16* | (2011.01) |
| *H04N 21/214* | (2011.01) |
| *H04N 21/258* | (2011.01) |
| *H04N 21/414* | (2011.01) |
| *H04N 21/45* | (2011.01) |
| *H04N 21/61* | (2011.01) |
| *H04N 21/81* | (2011.01) |

(52) U.S. Cl.
 CPC ... *G08G 1/096716* (2013.01); *G08G 1/096741* (2013.01); *G08G 1/096775* (2013.01); *H04N 7/162* (2013.01); *H04N 21/2143* (2013.01); *H04N 21/25841* (2013.01); *H04N 21/25891* (2013.01); *H04N 21/41422* (2013.01); *H04N 21/4532* (2013.01); *H04N 21/6131* (2013.01); *H04N 21/6181* (2013.01); *H04N 21/812* (2013.01); *H04N 21/8126* (2013.01)

(56) References Cited

U.S. PATENT DOCUMENTS

| | | | |
|---|---|---|---|
| 2004/0066330 A1* | 4/2004 | Knockeart et al. | 342/357.07 |
| 2005/0282519 A1 | 12/2005 | Kobayashi et al. | |
| 2006/0080030 A1* | 4/2006 | Okude et al. | 701/208 |
| 2007/0005609 A1* | 1/2007 | Breed | 707/10 |
| 2007/0040672 A1* | 2/2007 | Chinigo | 340/539.22 |
| 2007/0229490 A1* | 10/2007 | Boudreau et al. | 345/418 |
| 2008/0082251 A1* | 4/2008 | Ishikawa et al. | 701/118 |
| 2010/0241344 A1* | 9/2010 | Nagase et al. | 701/118 |

OTHER PUBLICATIONS

International Search Report for Application Serial No. PCT/JP2009/050193.

Notification of Transmittal of Translation of the International Preliminary Report on Patentability (Application No. PCT/JP2009/050193) dated Sep. 16, 2010.

Written Notification of Reason for Refusal (Application No. 2008-040734) dated Sep. 22, 2011.

* cited by examiner

| 10 | road-vehicle DSRC system |
| 11 | roadside device |
| 12 | server |
| 13 | vehicle |
| 15 | roadside apparatus |
| 17 | vehicle-mounted device |
| 18 | DSRC unit |
| 19 | navigation unit |

FIG. 6

| ID | CLASSIFICATION | | CONTENT OF INFORMATION |
|---|---|---|---|
| 00 | | CONSTITUTIVE ID INFORMATION | AREA IN WHICH ID INCLUDED IN DATA IS DESCRIBED |
| 01 | ENTERPRISER | SERVICE ENTERPRISER CODE | ENTERPRISER CODE FOR SPECIFYING SERVICE ENTERPRISER |
| | | SERVICE ENTERPRISER DISPLAY TEXT | SERVICE ENTERPRISER NAME FOR NAVIGATION DISPLAY (SERVICE NAME) TEXT INFORMATION |
| | | SERVICE ENTERPRISER PHONOGRAM STRING | SERVICE ENTERPRISER NAME FOR NAVIGATION UTTERANCE (SERVICE NAME) PHONOGRAPH STRING INFORMATION |
| 02 | CONTENTS | COMPANY CODE | CODE WITH WHICH INFORMATION PROVISION SOURCE OF CONTENTS CAN BE SPECIFIED |
| | | COMPANY DISPLAY TEXT | INFORMATION PROVISION COMPANY NAME FOR NAVIGATION DISPLAY TEXT INFORMATION |
| | | COMPANY PHONOGRAM STRING | INFORMATION PROVISION COMPANY NAME FOR NAVIGATION UTTERANCE PHONOGRAM STRING INFORMATION |
| | | INFORMATION CODE | INFORMATION CODE WITH WHICH CONTENTS CAN BE SPECIFIED |
| | | INFORMATION DISPLAY TEXT | CONTENTS FOR NAVIGATION DISPLAY TEXT INFORMATION |
| | | INFORMATION PHONOGRAM STRING | CONTENTS FOR NAVIGATION UTTERANCE PHONOGRAM STRING INFORMATION |
| | | TASTE DATA CATEGORY | CATEGORY CODE INDICATING INFORMATION CATEGORY CORRESPONDING TO INFORMATION |
| 03 | | DIRECT REPRODUCTION/ ACCUMULATION CODE | CODE REPRESENTING CONTENT REPRODUCTION OPERATION AFTER RECEPTION |
| | | REPRODUCTION REQUIREMENT CODE | CODE INDICATING CONTENT REPRODUCTION INFORMATION IN INFORMATION PROVISION AREA |
| 04 | VALID TERM | START YEAR, MONTH, DATE, HOUR, MINUTE, SECOND | VALID TERM OF CONTENTS |
| | | END YEAR, MONTH, DATE, HOUR, MINUTE, SECOND | VALID TERM OF CONTENTS |
| 05 | TIME PROVISION | BUSINESS HOURS | BUSINESS HOURS OF CONTENT PROVISION SOURCE |
| | | INFORMATION PROVISION HOURS | PROVISION HOURS OF CONTENTS |
| 06-0F | | | |
| 10 | OBJECT POINT | OBJECT POINT COORDINATES | LATITUDE AND LONGITUDE INFORMATION OF POINT WHERE SERVICE CAN BE PROVIDED |
| | | TEXT FOR DISPLAY OF OBJECT POINT | SERVICE NAME (STORE NAME, ETC.) |
| | | ALLIANCE PARKING LOT INFORMATION | ALLIANCE PARKING LOT INFORMATION AT POINTS OTHER THAN OBJECT POINT |
| | | ICON DISPLAY IMAGE DATA | DATA OF ICON REPRESENTING LOCATION WHERE SERVICE CAN BE PROVIDED |
| | | CHARACTER DATA FOR DISPLAY | TEST INFORMATION FOR EXPLANATION OF SERVICE |
| | | DISPLAY IMAGE DATA | STILL IMAGE INFORMATION REPRESENTING SERVICE |
| | | PHONOGRAM STRING DATA | PHONOGRAM STRING INFORMATION REPRESENTING SERVICE |
| | | COMPRESSION VOICE DATA | COMPRESSION VOICE DATA INFORMATION |
| | | VOICE REPRODUCTION ORDER | REPRESENTING REPRODUCTION ORDER OF PHONOGRAM STRING AND COMPRESSION VOICE |
| | | VIDEO DATA | VIDEO DATA INFORMATION |
| | | URL | URL INFORMATION REPRESENTING SERVICE |

| 21-2F | | | |
|---|---|---|---|
| 30 | TRANSITION INFORMATION | NEXT REPRODUCTION INFORMATION CODE 1 | SCREEN TRANSITION INFORMATION |
| | | ⋮ | ⋮ |
| | | NEXT REPRODUCTION INFORMATION CODE 8 | SCREEN TRANSITION INFORMATION |
| 31-3F | | | |
| 40 | DETAILED INFORMATION | DETAILED INFORMATION 1 | DETAILED INFORMATION |
| | | DETAILED INFORMATION 1 CHARACTER DATA FOR DISPLAY | DETAILED INFORMATION TEXT INFORMATION FOR NAVIGATION DISPLAY |
| | | DETAILED INFORMATION 1 PHONOGRAM STRING FOR UTTERANCE | DETAILED INFORMATION PHONOGRAM STRING INFORMATION FOR NAVIGATION UTTERANCE |
| | | ⋮ | ⋮ |
| | | DETAILED INFORMATION 8 | DETAILED INFORMATION |
| | | DETAILED INFORMATION 8 CHARACTER DATA FOR DISPLAY | DETAILED INFORMATION TEXT INFORMATION FOR NAVIGATION DISPLAY |
| | | DETAILED INFORMATION 8 PHONOGRAM STRING FOR UTTERANCE | DETAILED INFORMATION PHONOGRAM STRING INFORMATION FOR NAVIGATION UTTERANCE |
| 41-4F | | | |

| | | | |
|---|---|---|---|
| 80 | TASTE DATA | TASTE DATA VERSION | VERSION INFORMATION OF TABLE OF TASTE DATA |
| | | TASTE DATA TABLE 1 | TEXT INFORMATION FOR DISPLAY OF TABLE 1 OF TASTE DATA |
| | | TASTE DATA TABLE 1 PHONOGRAM STRING | PHONOGRAM STRING INFORMATION FOR UTTERANCE OF TABLE 1 OF TASTE DATA |
| | | TASTE DATA TABLE 1 DETAILED INFORMATION | DETAILED INFORMATION OF TABLE 1 OF TASTE DATA |
| | | ⋮ | ⋮ |
| | | TASTE DATA TABLE 127 | TEXT INFORMATION FOR DISPLAY OF TABLE 127 OF TASTE DATA |
| | | TASTE DATA TABLE 127 PHONOGRAM STRING | PHONOGRAM STRING INFORMATION FOR UTTERANCE OF TABLE 127 OF TASTE DATA |
| | | TASTE DATA TABLE 127 DETAILED INFORMATION | DETAILED INFORMATION OF TABLE 127 OF TASTE DATA |

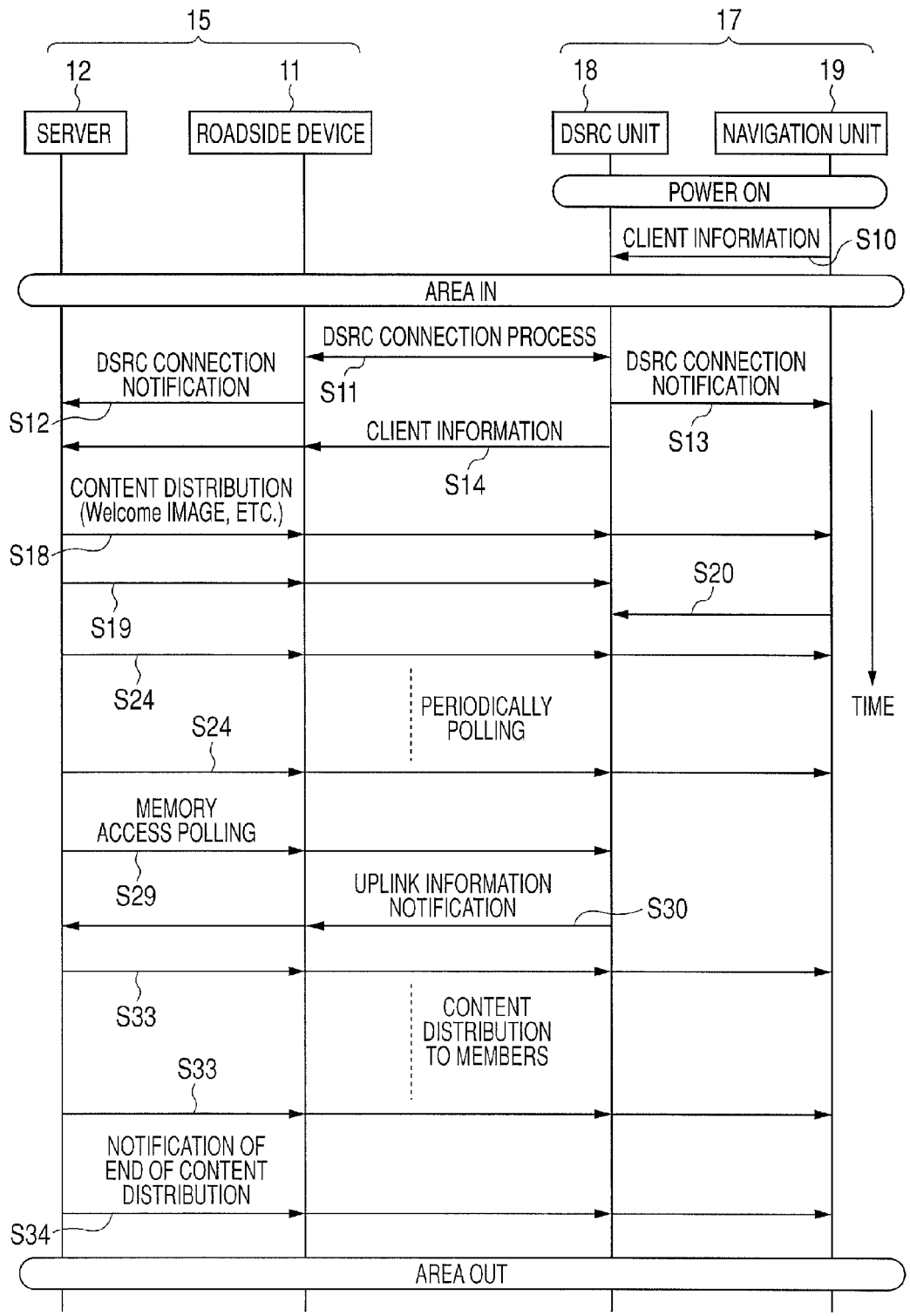

FIG. 8

| | | |
|---|---|---|
| TAG 1 | SERVICE ENTERPRISER CODE | |
| | DESTINATION | LATITUDE AND LONGITUDE |
| | WAY POINT 1 | LATITUDE AND LONGITUDE |
| | | ⋮ |
| | WAY POINT 5 | LATITUDE AND LONGITUDE |
| | CUMULATIVE TRAVELING DISTANCE | |
| | TASTE GENRE TABLE VERSION | |
| | TASTE GENRE DATA | |
| | MEMBER INFORMATION 1 | |
| | | ⋮ |
| | MEMBER INFORMATION 8 | |
| TAG 2 | SERVICE ENTERPRISER CODE | |
| | PAST STOP POINT 1 | LATITUDE AND LONGITUDE |
| | | ⋮ |
| | PAST STOP POINT 41 | LATITUDE AND LONGITUDE |
| TAG 3 | SERVICE ENTERPRISER CODE | |
| | PAST STOP POINT 42 | LATITUDE AND LONGITUDE |
| | | ⋮ |
| | PAST STOP POINT 82 | LATITUDE AND LONGITUDE |
| TAG 4 | SERVICE ENTERPRISER CODE | |
| | RECEPTION/REPRODUCTION HISTORY 1 | RECEPTION INFORMATION CODE |
| | | REPRODUCTION IDENTIFICATION FLAG |
| | | ⋮ |
| | RECEPTION/REPRODUCTION HISTORY 123 | RECEPTION INFORMATION CODE |
| | | REPRODUCTION IDENTIFICATION FLAG |
| TAG 5 | SERVICE ENTERPRISER CODE | |
| | RECEPTION/REPRODUCTION HISTORY 124 | RECEPTION INFORMATION CODE |
| | | REPRODUCTION IDENTIFICATION FLAG |
| | | ⋮ |
| | RECEPTION/REPRODUCTION HISTORY 246 | RECEPTION INFORMATION CODE |
| | | REPRODUCTION IDENTIFICATION FLAG |

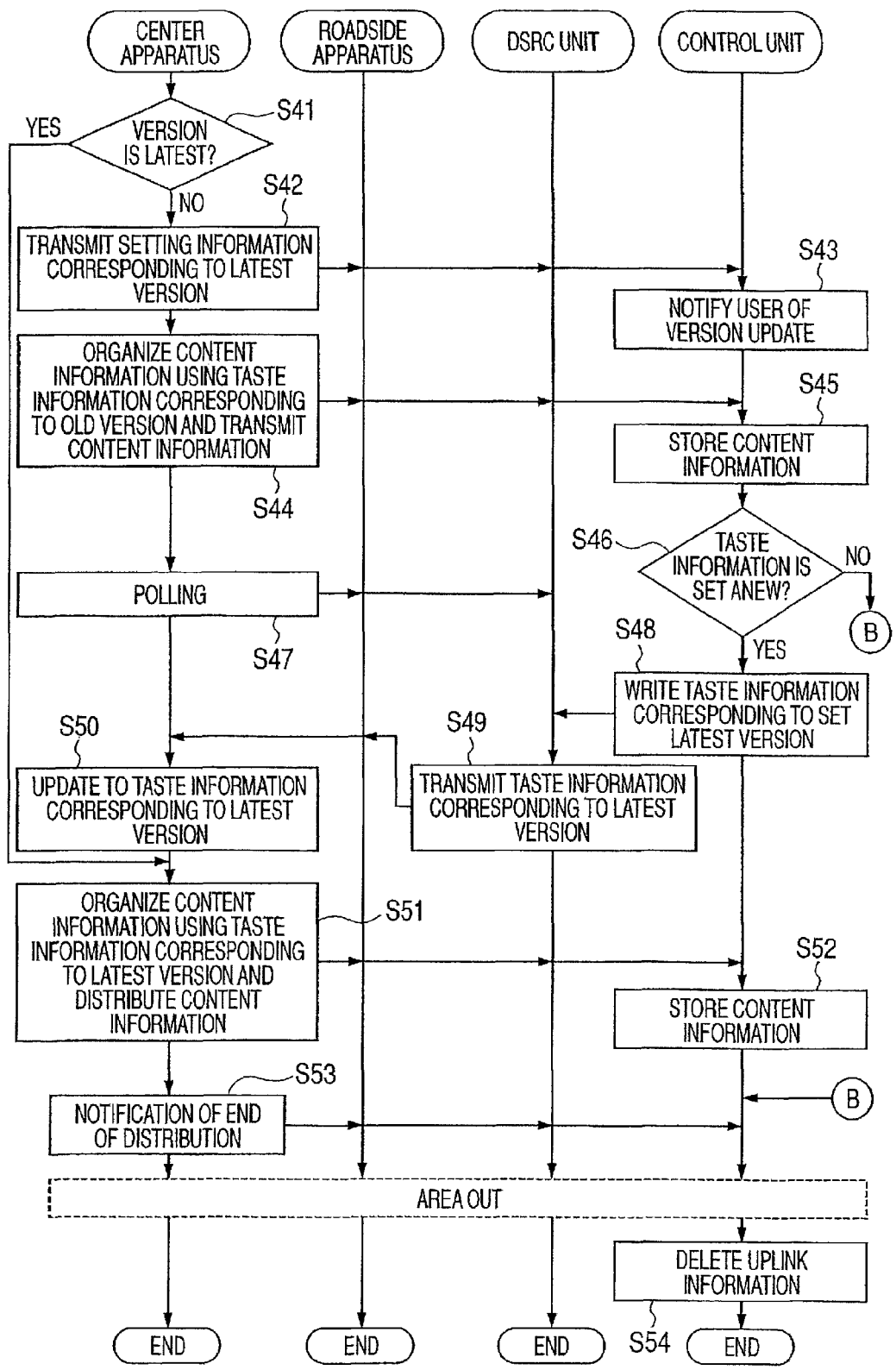

FIG. 10

```
PLEASE SET TASTE INFORMATION
1  ☑ LIFE                              ▼▲
2     ☐ HOSPITAL                       ▼
3        ☐ PEDIATRICS
4        ☐ SURGERY
5        ☐ INTERNAL MEDICINE
6     ☑ ROAD SERVICE                   ▼
7        ☑ ○ CAR                       ▼
8           ☑ NEWS
9           ☑ AUDIO
10          ☑ NAVIGATION
11       ☐ △ GAS                       ▼▼
``` d1

FIG. 11

| DATA NUMBER | TEXT FOR DISPLAY | NEST FOR DISPLAY | TARGET IDENTIFIER | DEFAULT VALUE |
|---|---|---|---|---|
| ⋮ | | | | |
| 30 | ENTERTAINMENT | 0 | 0 | |
| 31 | ACTION | 1 | 0 | |
| 32 | FOREIGN FILM | 2 | 1 | 0 |
| 33 | JAPANESE FILM | 2 | 1 | 0 |
| ⋮ | | | | |

FIG. 12

| DISPLAY TEXT/NEST | | | TASTE DATA | TASTE DATA NUMBER |
|---|---|---|---|---|
| | | | | |
| ENTERTAINMENT | | | | 30 |
| | ACTION | | | 31 |
| | | FOREIGN FILM | 1 | 32 |
| | | JAPANESE FILM | 0 | 33 |

FIG. 13A

| DATA NUMBER | TEXT FOR DISPLAY | NEST FOR DISPLAY | TARGET IDENTIFIER | DEFAULT VALUE |
|---|---|---|---|---|
| ⋮ | | | | |
| 30 | DOMESTIC TRAVEL | 0 | 0 | |
| 31 | HOKKAIDO | 1 | 0 | |
| 32 | DOHOKU | 2 | 1 | 1 |
| 33 | DONAN | 2 | 1 | 1 |
| ⋮ | | | | |
| 50 | OVERSEAS TRAVEL | 0 | 0 | |
| 51 | OHSHU | 1 | 0 | |
| 52 | SEIO | 2 | 1 | 1 |
| 53 | TOH-O | 2 | 1 | 1 |
| ⋮ | | | | |

FIG. 13B

| DATA NUMBER | TEXT FOR DISPLAY | NEST FOR DISPLAY | TARGET IDENTIFIER | DEFAULT VALUE |
|---|---|---|---|---|
| ⋮ | | | | |
| 30 | DOMESTIC TRAVEL | 0 | 0 | |
| 31 | HOKKAIDO | 1 | 0 | |
| 32 | WAKKANAI | 2 | 1 | 1 |
| 33 | HAKODATE | 2 | 1 | 1 |
| ⋮ | | | | |
| 50 | OVERSEAS TRAVEL | 0 | 0 | |
| 51 | EUROPE | 1 | 0 | |
| 52 | WESTERN EUROPE | 2 | 1 | 1 |
| 53 | EASTERN EUROPE | 2 | 1 | 1 |
| ⋮ | | | | |

FIG. 14

| STOP POINT | NUMBER OF TIMES | LAST STOP TIME |
|---|---|---|
| CAR EQUIPMENT SALES AUTOFRONTS | 5 | 2008/02/12 12:34 |
| RENTAL VIDEO OK DO | 1 | 2006/05/02 23:45 |
| FISHING TACKLE MARUHACHIYA | 3 | 2007/12/10 11:22 |
| : | | |

FIG. 15

| STOP POINT | TASTE DATA |
|---|---|
| TAMA CINEMAS | NEW FILMS |
| | SCREEN SCHEDULE |
| AUTOFRONTS | CAR EQUIPMENT |
| FISHING TACKLE MARUHACHIYA | FISHING TACKLE |
| | CATCH INFORMATION |
| : | |

FIG. 16A

| DISPLAY TEXT/NEST | | | TASTE DATA | TASTE DATA NUMBER |
|---|---|---|---|---|
| ⋮ | | | | |
| DOMESTIC TRAVEL | | | | 50 |
| | HOKKAIDO | | | 51 |
| | | DOH-O | 1 | 52 |
| | | DONAN | 1 | 53 |
| | | ⋮ | | |
| OVERSEAS TRAVEL | | | | 60 |
| | OHSHU | | | 61 |
| | | SEIO | 1 | 62 |
| | | TOH-O | 1 | 63 |

FIG. 16B

| DISPLAY TEXT/NEST | | | TASTE DATA | TASTE DATA NUMBER |
|---|---|---|---|---|
| ⋮ | | | | |
| DOMESTIC TRAVEL | | | | 50 |
| | HOKKAIDO | | | 51 |
| | | SAPPORO/MURORAN | 1 | 52 |
| | | DOH-O | 1 | 53 |
| | | ⋮ | | |
| OVERSEAS TRAVEL | | | | 60 |
| | OHSHU | | | 61 |
| | | ENGLAND | 1 | 62 |
| | | FRANCE | 1 | 63 |
| | | TOH-O | 1 | 64 |

US 9,002,878 B2

ROADSIDE APPARATUS, CONTROL METHOD AND PROGRAM

TECHNICAL FIELD

The present invention relates to a roadside apparatus, a control method, and a program for transmitting and receiving information related to a taste data table using communication between road-vehicles such as DSRC (Dedicated Short Range Communication).

BACKGROUND ART

Patent Document 1 discloses a road-vehicle communication system employing the DSRC (FIG. 1 of Patent Document 1). In the road-vehicle communication system, a vehicle-mounted device of a vehicle entering a communication area of a roadside device receives advertisement information from the roadside device via radio waves and displays the advertisement information on a display of a navigation unit (paragraph 0024 of Patent Document 1). The vehicle-mounted device automatically carries out destination setting, HP connection, and dialing on the basis of location information, a URL, and a telephone number included in the advertisement information (S12, S14, and S16 in FIG. 4 of Patent Document 1).

Patent Document 2 discloses that a vehicle-mounted information terminal apparatus receives, together with advertisement information, area information and time zone information associated with the advertisement information via radio waves from an information center (FIG. 1 of Patent Document 2) and displays the advertisement information (FIG. 4 of Patent Document 2) in an area related to the area information and a time zone related to the time zone information (S14 to S16 in FIG. 5 of Patent Document 2).

Patent Document 3 discloses an advertisement distribution system employing the DSRC (FIG. 1 of Patent Document 3). In the advertisement distribution system, taste information is notified from a vehicle-mounted device to a roadside apparatus (paragraph 0017 of Patent Document 3), the roadside apparatus transmits advertisement information selected on the basis of the taste information to the vehicle-mounted device, and the vehicle-mounted device reproduces the advertisement information (paragraphs 0028 and 0029 of Patent Document 3).

Patent Document 1: Japanese Patent Application Laid-Open No. 2001-101578
Patent Document 2: Japanese Patent Application Laid-Open No. 2004-279509
Patent Document 3: Japanese Patent Application Laid-Open No. 2005-134707

DISCLOSURE OF THE INVENTION

Problems to be Solved by the Invention

Data in a data format is basically distributed in a push-type information distribution system by individual communication in the 5.8 GHz band DSRC communication. A taste data table is included in downlink information. User taste information as results of responses of users to the taste data table is included in uplink information. A roadside apparatus selects appropriate advertisement information for each of the users on the basis of the user taste information and transmits the advertisement information to a vehicle-mounted device.

In some case, the taste data table is revised to suit convenience of a service enterpriser. In the taste data table, there are ninety-six items for which the user has to input presence or absence of tastes of the user. It takes a lot of time and labor for the user to input all the items one by one. Unrevised items are included in items of a taste data table of a new version. The labor and time of the user can be reduced by directly setting, concerning those items, user taste information of a taste data table of an old version as default values. However, there is a demand for appropriate measures for default value setting concerning revised items.

Patent Documents 1 to 3 do not indicate a technique for reducing the labor and time of the user input to the taste data table of the new version.

It is an object of the present invention to provide a roadside apparatus, a control method, and a program that can give appropriate default values to items of the taste data table of the new version.

Means for Solving the Problems

According to the present invention, user taste information corresponding to a taste data table of an old version is stored in a storage device and an item correspondence relation between items of a taste data table of a new version and items of the old version taste data table having user taste information inherited by the taste data table of the new version as default values is registered. When the items of the taste data table of the new version is sent to a user together with the default values, taste information of the user corresponding to correspondence items of the old version taste data table is calculated on the basis of the item correspondence relation and the calculated taste information is set as default values of the items of the taste data table of the new version.

According to an aspect of the present invention, a distribution system of the present invention is a distribution system including: a center apparatus that organizes content information according to user taste information and distributes the content information; a vehicle-mounted device that provides the center apparatus with the user taste information; and a roadside apparatus that transmits information of a taste data table to the vehicle-mounted device, which enters a radio communication area, together with version information of the taste data table and receives uplink information including the user taste information corresponding to the taste data table from the vehicle-mounted device. When the center apparatus receives the user taste information from the vehicle-mounted device, the center apparatus determines whether the information of the taste data table corresponds to a latest version and, when the information does not correspond to the latest version, generates setting information for setting information of the taste data table corresponding to the latest version. The setting information is information for setting information of the taste data table by classifying the information into a plurality of items. Concerning items corresponding to the latest version among the received information of a taste information of an old version, the center apparatus generates setting information in which the information of the taste data table of the old version is set in advance and transmits the setting information to the vehicle-mounted device.

According to a second aspect of the present invention, a control method of the present invention is a control method for a roadside apparatus that transmits information of a taste data table to a vehicle-mounted device, which enters a radio communication area, together with version information of the taste data table and receives uplink information including user taste information corresponding to the taste data table from the vehicle-mounted device, the control method including: a saving step for causing a storage device to store the user taste information corresponding to a taste data table of an old version; a revised item searching step for searching for items revised from the old version among items of a taste data table of a new version; a default value setting step for setting default values of the revised items of the taste data table of the new version in the user taste information of correspondence items of the taste data table of the old version on the basis of a correspondence relation between items of the taste data table of the old version and items of the taste data table of the new version that inherits the user information corresponding to the items; and a transmission information transmitting step for transmitting transmission information including information of the taste data table of the new version, for which the default values are set, to the vehicle-mounted device.

According to a third aspect of the present invention, a program of the present invention is a computer readable program stored in a recording medium and for executing a control method for a roadside apparatus that transmits information of a taste data table to a vehicle-mounted device, which enters a radio communication area, together with version information of the taste data table and receives uplink information including user taste information corresponding to the taste data table from the vehicle-mounted device, the program including: a saving step for causing, with storing means, a storage device to store the user taste information corresponding to a taste data table of an old version; a revised item searching step for searching for, with revised item search means, items revised from the old version among items of a taste data table of a new version; a default value setting step for setting, with default value set means, default values of the revised items of the taste data table of the new version in the user taste information of correspondence items of the taste data table of the old version on the basis of a correspondence relation between items of the taste data table of the old version and items of the taste data table of the new version that inherits the user information corresponding to the items; and a transmission information transmitting step for transmitting, with transmission information transmitting means, transmission information including information of the taste data table of the new version, for which the default values are set, to the vehicle-mounted device.

EFFECTS OF THE INVENTION

According to the present invention, it is possible to set appropriate default values for revise items of a taste data table of a new version on the basis of an item correspondence relation of new and old taste data tables and reduce labor and time of input by a user in the taste data table of the new version.

BRIEF DESCRIPTION OF THE DRAWINGS

FIG. 6 is a classification table allocated to IDs used in downlink;
FIG. 7 is a diagram showing communication and processing among devices carried out in transaction between roadside apparatus and an ITS vehicle-mounted device;
FIG. 8 is a data schematic explanatory diagram of uplink information transmitted from the ITS vehicle-mounted device to the roadside apparatus;
FIG. 9 is a diagram for explaining a flow of processing in the distribution system;
FIG. 10 is a diagram showing an example of an operation screen for setting taste information corresponding to a latest version;
FIG. 11 is a diagram showing an example of a taste data table transmitted from the roadside apparatus to the ITS vehicle-mounted device;
FIG. 12 is a taste data table generated in the ITS vehicle-mounted device on the basis of the taste data table shown in FIG. 11;
FIGS. 13A-13B are diagrams showing taste data tables of new and old versions in comparison;
FIG. 14 is diagram showing information after the roadside apparatus arranges stop point information of a vehicle received being included in uplink information from a roadside apparatus of the vehicle by the roadside apparatus during area in of the vehicle;
FIG. 15 is a diagram showing a relation between stop points and taste data set by the roadside apparatus;
FIGS. 16A-16B are diagrams showing a display example of taste data table of new and old versions displayed in the ITS vehicle-mounted device when the roadside apparatus transmits special information concerning revised item in the taste data table of the new version to the ITS vehicle-mounted device.

DESCRIPTION OF REFERENCES

15: roadside apparatus, 51: storing means, 52: revised item search means, 53: default value set means, 54: downlink information transmitting means, 58: storage device, 60: roadside apparatus control method

BEST MODES FOR CARRYING OUT THE INVENTION

Figure 1:
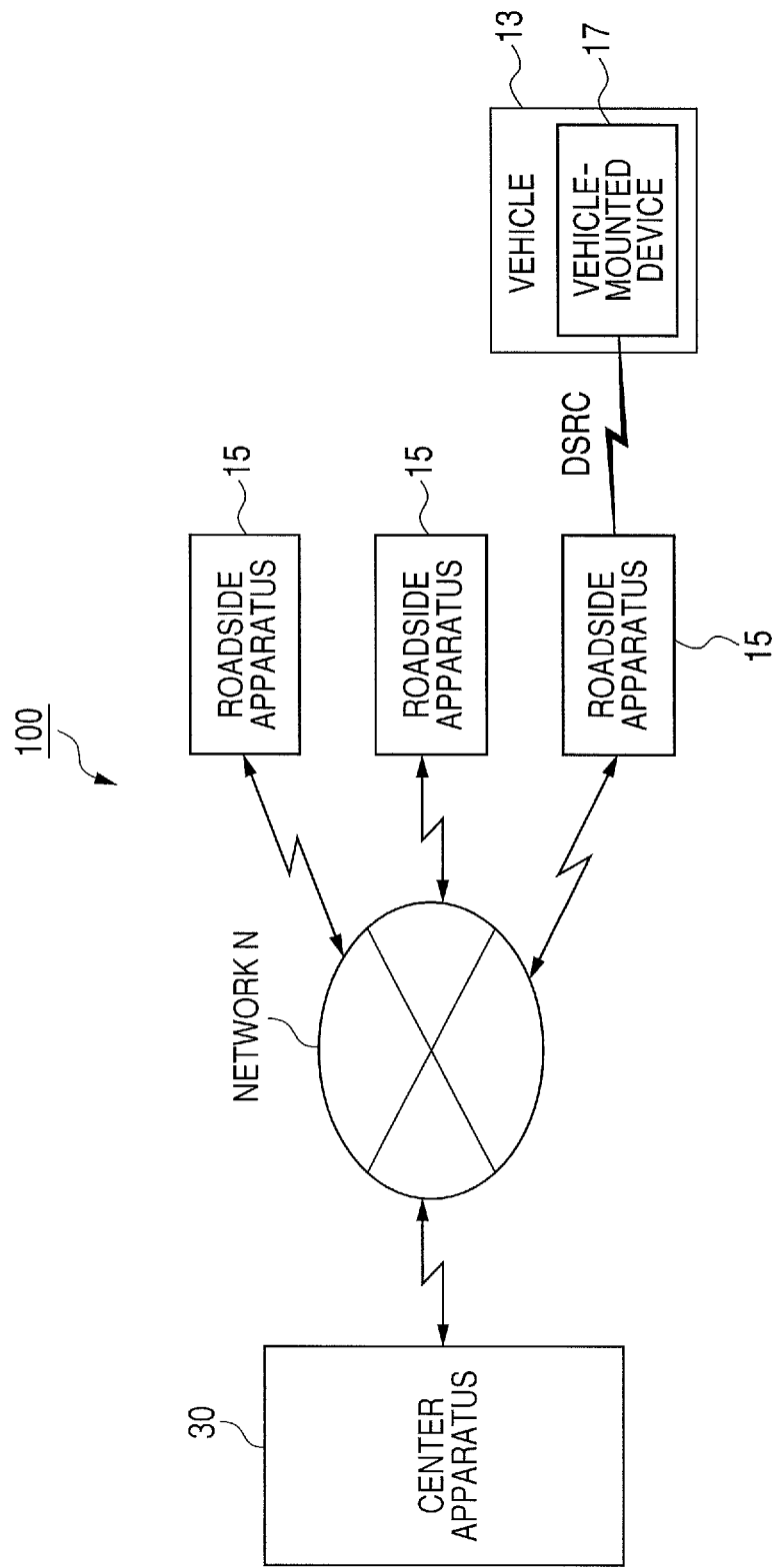
FIG. 1 is a diagram showing a distribution system in an embodiment of the present invention.
Figure 2:
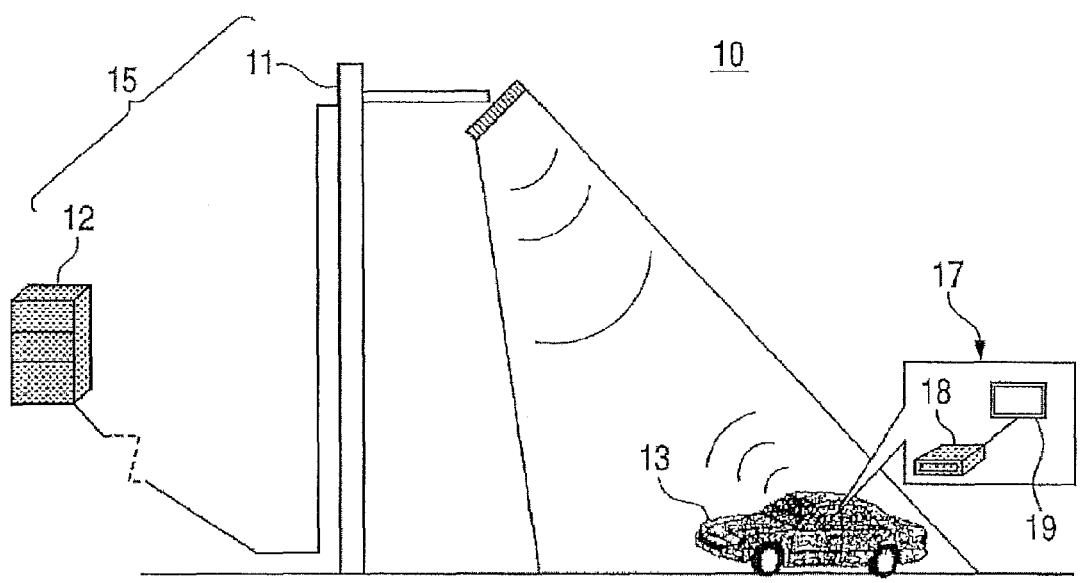
FIG. 2 is a schematic diagram of a road-vehicle DSRC system based on data of a town car life navigation multi-contents format.

First, a configuration is explained.
In FIG. 1, a distribution system 100 in an embodiment of the present invention is shown.
The distribution system 100 includes, as shown in FIG. 1, a vehicle-mounted device 17 mounted on a vehicle 13, a roadside apparatus 15, and a center apparatus 30. The center apparatus 30 distributes content information to the vehicle-mounted device 17 via the roadside apparatus 15. A plurality of roadside apparatuses 15 are set on roads, parking lots, and the like and connected to the center apparatus 30 via a network N. The roadside apparatuses 15 and the vehicle-mounted device 17 of the vehicle 13 traveling on a road can perform radio communication.
FIG. 2 is a schematic diagram of a road-vehicle DSRC system 10 based on data of a town car life navigation multi-contents format. A roadside device 11 configures the roadside apparatus 15 together with a server 12 and is connected to the server 12 by wire or radio. The server 12 can freely transmit and receive data to and from other servers via a network such as the Internet. The roadside device 11 transmits and receives, using a radio wave in the 5.8 GHz band, data to and from the ITS vehicle-mounted device 17 mounted on the vehicle 13 present in an area with length of several m to 30 m. The ITS vehicle-mounted device 17 includes a DSRC unit 18 and a navigation unit 19.

The content information means a set of information transmitted to the vehicle-mounted device 17 including, besides contents (text information, image information, and sound information) such as advertisements of stores and guides to parking lots and medical facilities, information concerning an enterpriser that provides the contents, information concerning a valid term of the contents (e.g., date and time of the start and the end of the valid term), information concerning objects points where services can be provided (e.g., latitude and longitude indicating points of the advertised stores and store names), a reproduction point where popup reproduction for performing notification of the contents (e.g., latitude and longitude indicating the reproduction point and information for designating a road type to be reproduced and an entering direction of a vehicle), transition information of a display screen for the contents (information for designating a screen to be displayed next, etc.), and taste information explained later.

The contents are classified according to items set in the taste information. Information indicating the classified items is included in the content information.

The vehicle-mounted device 17 is mounted on the vehicle 13 and has, for example, a function of performing processing for ETC (Electronic Toll Collection System) use by DSRC besides a navigation function for performing, for example, processing for guide to a guide route.

Figure 3:
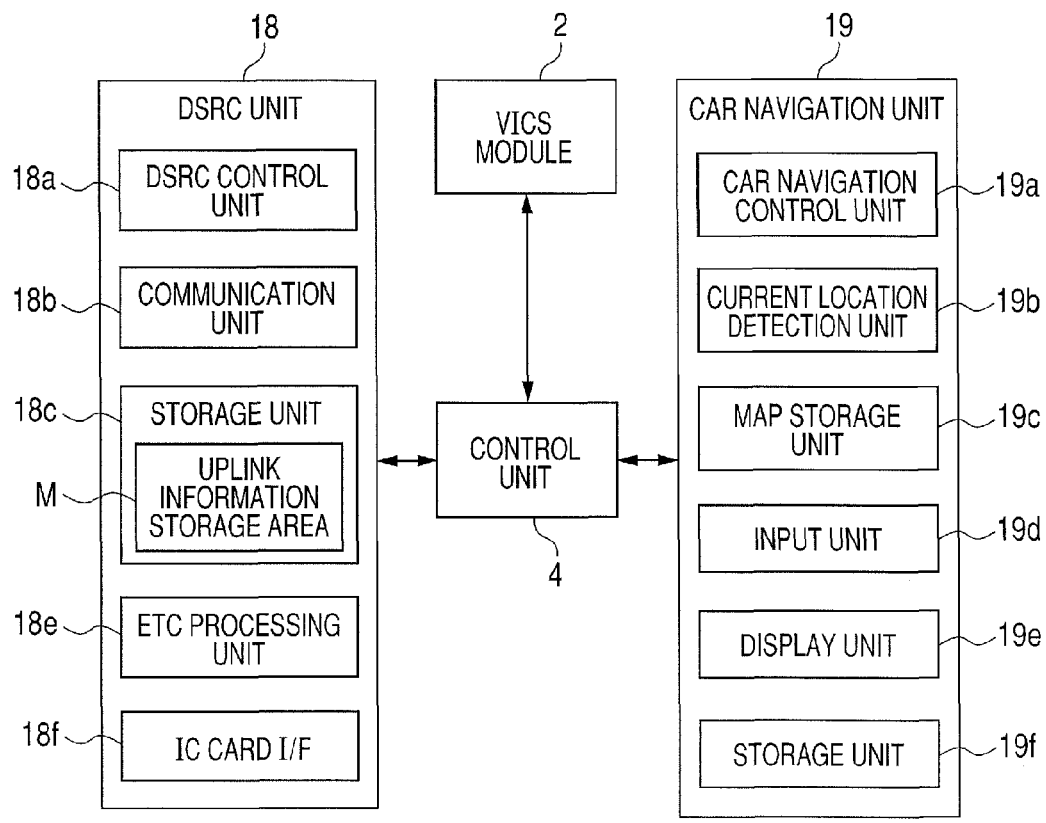
FIG. 3 is a diagram showing the functional configuration of a vehicle-mounted device shown in FIG. 1.

The vehicle-mounted device 17 includes, as shown in FIG. 3, the car navigation unit 19, a VICS module 2, the DSRC unit 18, and a control unit 4.

The control unit 4 includes a CPU (Central Processing Unit) and a RAM (Random Access Memory). The control unit 4 performs concentrated control for the units besides performing various arithmetic operations in cooperation with a control program stored in the storage unit 19f.

For example, when road-vehicle communication with the roadside apparatus 15 is performed, the control unit 4 controls communication operation of the DSRC unit 18. In the control of the DSRC unit 18, the control unit 4 performs the control in cooperation with a DSRC control unit 18a of the DSRC unit 18. The control unit 4 performs storage, reproduction control, and the like of content information received from the center apparatus 30 via the DSRC unit 18.

The car navigation unit 19 includes a car navigation control unit 19a, a current location detection unit 19b, a map storage unit 19c, an input unit 19d, a display unit 19e, and a storage unit 19f and performs processing for guiding the vehicle 13 to the guide route.

The car navigation control unit 19a calculates, on the basis of, for example, information concerning a current location acquired from the current location detection unit 19b and map information stored in the map storage unit 19c, a guide route to a destination set from the current location of the vehicle 13 via the input unit 19d. The car navigation control unit 19a generates a map screen for guiding the vehicle 13 to the guide route calculated by using the map information stored in the map storage unit 19c and causes the display unit 19e to display the map screen.

The current location detection unit 19b includes various sensors such as a GPS antenna, an angle sensor, a direction sensor, and a distance sensor and detects the current location of the vehicle 13 on the basis of detection results of these sensors. The GPS antenna detects a GPS signal transmitted from a GPS satellite. The angle sensor detects acceleration (rotating speed in the horizontal direction per unit time) of a vehicle indicating an amount of change in a moving direction. The direction sensor performs detection of geomagnetism and detects an absolute direction of the vehicle. The current location detection unit 19b generates current location information (information such as latitude and longitude) indicating the current location of the vehicle on the basis of the detection results acquired from these sensors and outputs the current location information to the car navigation control unit 19a.

The map storage unit 19c includes a storage medium such as a memory or a DVD and stores, for example, map information necessary for guide display and guide information (road information, traffic jam information, etc.) received via the VICS module 2.

The input unit 19d includes operation keys and a touch panel integrally formed with the display unit 19e. The input unit 19d generates operation signals corresponding to operation of the operation keys, the touch panel, and the like and outputs the operation signals to the control unit 4.

The display unit 19e includes a monitor and displays various kinds of information on the monitor according to the control by the control unit 4. The display unit 19e displays, for example, a setting screen, a map screen, and a display screen for content information received from the center apparatus 30.

The storage unit 19f includes a memory and stores control programs executed by the control unit 4 and the car navigation control unit 19a and parameters, data, and the like necessary for execution of the programs.

The storage unit 19f stores uplink information provided to the center apparatus 30 and stores content information received from the center apparatus 30. When there are a plurality of distribution enterprisers (hereinafter referred to regular distribution enterprisers) with which a user enters into an agreement concerning distribution of the content information, the uplink information is generated by the control unit 4 with contents corresponding to the respective distribution enterprisers and stored in the storage unit 19f. The control unit 4 always updates the uplink information to include latest content and causes the storage unit 19f to store the uplink information.

The VICS module 2 includes antennas respectively for optical communication, FM communication, and 2.4 GHz radio wave communication and performs the optical communication, the FM communication, and the radio wave communication with a VICS center. The VICS module 2 receives traffic jam information, road traffic information, and the like from the VICS center and outputs the information to the control unit 4.

The DSRC unit 18 performs, for example, processing for ETC use by the DSRC and communication processing for receiving content information from the center apparatus 30.

The DSRC unit 18 includes, as shown in FIG. 3, a DSRC control unit 18a, a communication unit 18b, a storage unit 18c, an ETC processing unit 18e, and an IC card I/F 18f.

The DSRC control unit 18a includes a CPU and a RAM and controls the operation of the units of the DSRC unit 18 in cooperation with a control program stored in the storage unit 18c.

For example, when settlement by the ETC is performed, the DSRC control unit 18a controls communication operation of the communication unit 18b to cause the communication unit 18b to perform transmission and reception of settlement information to and from an ETC base station (a radio base station provided near an ETC gate in order to perform ETC settlement). The DSRC control unit 18*a* causes the ETC processing unit 18*e* to perform writing processing for settlement information.

When content information is received from the center apparatus 30, the DSRC control unit 18*a* causes the communication unit 18*b* to transmit information, which is stored in an uplink information storage area M of the storage unit 18*c* according to an instruction of the control unit 4, to the roadside apparatus 15. On the other hand, when content information is received by the communication unit 18*b* via the roadside apparatus 15, the DSRC control unit 18*a* outputs the content information to the control unit 4.

The communication unit 18*b* includes an antenna fixedly provided on a dashboard and near an windshield of the vehicle 13 and performs transmission and reception of a radio wave of the DSRC to and from the roadside apparatus 15, the ETC base station, and the like via this antenna. The storage unit 18*c* has stored therein a control program and the like executed by the DSRC control unit 18*a*.

The uplink information storage area M is provided in the storage unit 18*c*.

The ETC processing unit 18*e* reads settlement information and the like from and writes the settlement information and the like in a credit card with IC, a debit card, or the like inserted into and removed from the IC card I/F 18*f*.

The IC card I/F 18*f* includes a slot for the credit card and the like and mediates exchange of information between the IC of the credit card or the like inserted in this slot and the ETC processing unit 18*e*.

Next, the center apparatus 30 is explained.

The center apparatus 30 stores content information and distributes the content information to the vehicle-mounted device 17.

In FIG. 1, only one center apparatus 30 is shown. However, there are a plurality of distribution enterprisers that distributes content information. The center apparatus 30 is provided for each of the distribution enterprisers.

Figure 4:
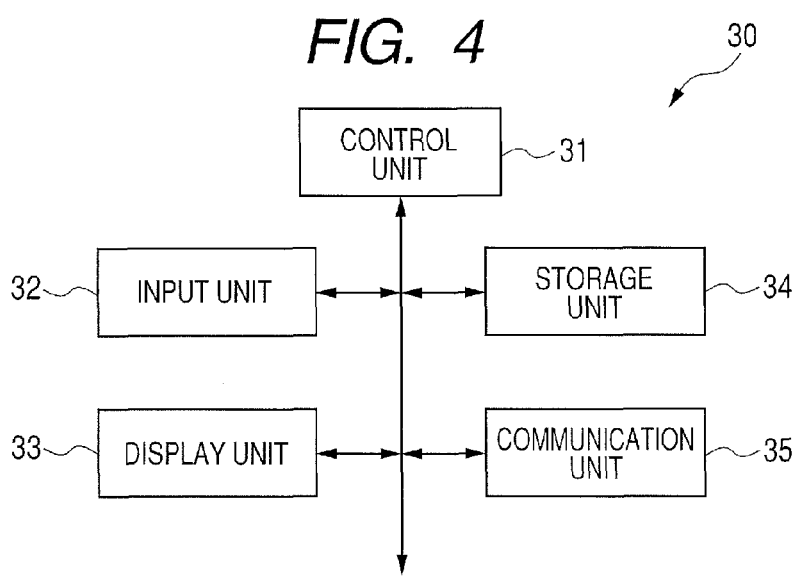
FIG. 4 is a diagram showing the functional configuration of a center apparatus.

In FIG. 4, the functional configuration of the center apparatus 30 is shown.

As shown in FIG. 4, the center apparatus 30 includes a control unit 31, an input unit 32, a display unit 33, a storage unit 34, and a communication unit 35.

The control unit 31 includes a CPU and a RAM and performs concentrated control of the units besides performing various arithmetic operations in cooperation with a control program stored in the storage unit 34.

For example, the control unit 31 reads out and organizes content information stored in the storage unit 34 and performs distribution control for the organized content information. The organizing means, for example, selecting, on the basis of uplink information, content information to be distributed.

The input unit 32 includes a keyboard, receives operation input, and outputs an operation signal corresponding to the operation input to the control unit 31.

The display unit 33 includes a display and displays various screens on the display according to display control by the control unit 31.

The storage unit 34 stores, besides a program executed by the control unit 31, various data necessary for execution of the program. The storage unit 34 has stored therein content information that should be distributed. As explained above, the content information is classified according to items of taste information.

The storage unit 34 has stored therein enterpriser codes individually given to distribution enterprisers of the content information. When users enter into an agreement for joining a distribution service for content information, since the users perform membership registration, the storage unit 34 stores specific information such as names and addresses of the users registered as members. Besides, the storage unit 34 stores information such as vehicle-mounted device IDs of the vehicle-mounted devices 17 owned by the users and taste information of the users in a form of a database for each of the users.

Figure 5:
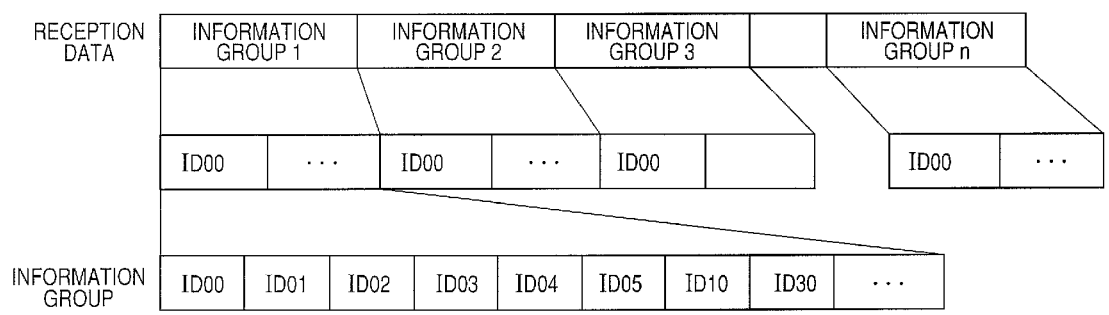
FIG. 5 is an explanatory diagram of a data transmission form of the down car life navigation multi-contents format.

FIG. 5 is an explanatory diagram of a data transmission form. In downlink, data is classified according to types thereof. ID codes "00", "01", "02", and the like are allocated to each of the classifications. In data transmission of a multi-contents form, data is sorted in units of information groups. Each of the respective information group has classification data of ID="00" at the top. The classification data of ID="00" is constitutive information concerning what kind of an ID is included the information group.

FIG. 6 is a classification table allocated to IDs used in the downlink. ID=00 is classification of constitutive ID information (an area in which an ID included in data is described). ID=01 is classification of enterprisers and includes a service enterpriser code (an enterpriser code with which a service enterpriser can be specified), a service enterpriser display text (service enterpriser name (service name) text information for navigation display), and a service enterpriser phonogram string (service enterpriser name (service name) phonogram string information for navigation display).

ID=02 is classification of contents and includes a company code (a code with which an information provision source of contents can be specified), a company display text (information provision company name text information for navigation display), a company phonogram string (information provision company name phonogram string information for navigation utterance), an information code (an information code with which contents can be specified), an information display text (content text information for navigation display), an information phonograph string (content phonogram string information for navigation utterance), and a taste data category (a category code indicating an information category corresponding to information).

Like ID=02, ID=03 is classification of contents and includes a direct reproduction/accumulation code (a code representing content reproduction operation after reception) and a reproduction requirement code (a code indicating content reproduction requirements in an information provision area).

ID=04 is classification of valid terms and includes start year, month, date, hour, minute, and second (a valid term of contents) and end year, month, day, hour, minute, and second (a valid term of contents). ID=05 is classification of provision hours and includes business hours (business hours of a content provision source) and information provision hours (content provision hours).

ID=10 is classification of object points and includes object point coordinates (latitude and longitude information of points where services can be provided), a text for display of object point (a service name (a store name, etc.)), alliance parking lot information (alliance parking lot information at points other than the object point), icon display image data (data of icons representing locations where services can be provided), character data for display (test information for explanation of services), display image data (still image information representing services), phonogram string data (phonogram string information representing services), compression voice data (compression voice data information), voice reproduction order (representing reproduction order of phonogram string and compression voice), video data (video data information), and a URL (URL information representing services).

ID=20 is classification of information provision points and includes, concerning five information provision points in total, information provision center point coordinates (latitude and longitude information for reproducing popup information), an information provision area (radius information from center coordinates for defining an area in which the popup information is reproduced), an information provision direction code (information provision direction information for reproducing the popup information), an information provision road type (road type information for reproducing the popup information), display image data (data of a still image to be popup-reproduced), phonogram string data (phonogram string information to be popup-reproduced), compression voice data (data of compression voice to be popup-reproduced), and voice reproduction order (a code representing reproduction order of voice data to be popup-reproduced).

ID=30 is classification of transition information and includes eight next reproduction information codes in total (screen transition information). ID=40 is classification of detailed information and includes, concerning eight pieces of detailed information in total, character data for display (detailed information text information for navigation display) and a phonogram string for utterance (detailed information phonogram string information for navigation utterance).

ID=50 is classification of parking lot information and includes, concerning one hundred twenty-seven pieces of parking lot information in total, a parking lot ID (an ID with which a parking lot can be specified), detailed information (dynamic detailed information of the parking lot), particulars (particulars of the parking lot), and a particulars phonogram string (a particulars phonogram string for navigation utterance). ID=60 is classification of driving support and includes driving support image data (driving support image information), a driving support phonogram string (data driving support phonogram string information), driving support compression voice (data driving support compression voice information), and voice reproduction order (representing phonogram string and reproduction order of compression voice).

ID=80 is classification of taste data and includes, concerning one hundred twenty-seven tables of taste data, a taste data version (version information of a table of taste data), a taste data table (text information for display of the table of taste data), a phonogram string (phonogram string information for utterance of the table of taste data), and detailed information (detailed information of the table of taste data).

FIG. 7 shows communication and processing among devices carried out in transaction between the roadside apparatus 15 and the ITS vehicle-mounted device 17. The roadside device 11 and the server 12 configure the roadside apparatus 15. The ITS vehicle-mounted device 17 includes the DSRC unit 18 and the navigation unit 19. The communication and the processing are explained in time order. The communication between the roadside device 11 and the DSRC unit 18 is performed via DSRC radio waves. The communication between the roadside device 11 and the server 12 and between the DSRC unit 18 and the navigation unit 19 is usually performed by radio or wire.

FIG. 8 is a data schematic explanatory diagram of uplink information transmitted from the ITS vehicle-mounted device 17 to the roadside apparatus 15. The uplink information is transmitted by a plurality of tags. A tag 1 includes a service enterpriser code, a destination (latitude and longitude), way points (latitudes and longitudes) 1 to 5, a cumulative traveling distance, a taste genre data version, taste genre data, and member information 1 to 8. A tag 2 includes a service enterpriser code and past stop points (latitudes and longitudes) 1 to 41. A tag 3 includes a service enterpriser code and past stop points (latitudes and longitudes) 42 to 82.

A tag 4 includes a service enterpriser code and reception/reproduction histories (reception information codes and reproduction identification flags) 1 to 123. A tag 5 includes a service enterpriser code and reception/reproduction histories (reception information codes and reproduction identification flags) 124 to 246.

When power is turned on in the ITS vehicle-mounted device 17, in S10, client information data is written from the navigation unit 19 in the DSRC unit 18. When the vehicle 13 mounted with the ITS vehicle-mounted device 17 enters a radio wave reaching area of a distance (e.g., about 30 m) in which the vehicle 13 can communicate with the roadside device 11, in S11, DSRC connection process is carried out between the roadside device 11 and the DSRC unit 18.

When the DSRC connection process in S11 ends, DSRC connection notification is performed in S12 and S13. The connection notification in S12 is connection notification from the roadside device 11 to the server 12. The connection notification in S13 is connection notification from the DSRC unit 18 to the navigation unit 19. In S14, client information is notified from the DSRC unit 18 to the server 12 via the roadside device 11.

The server 12 reads a vehicle-mounted device ID uniquely attached to the DSRC unit 18 to discriminate whether a user of the ITS vehicle-mounted device 17 is a member or a non-member and learns, on the basis of the client information notified from the DSRC unit 18 after establishment of communication, hardware information of the ITS vehicle-mounted device 17 for properly reproducing contents in the ITS vehicle-mounted device 17. In S18, the server 12 transmits contents such as a Welcome screen to the navigation unit 19 through the roadside device 11 and the DSRC unit 18. The contents are organized in a multi-contents format. The navigation unit 19 determines a service enterpriser from the multi-contents format.

In S19, the server 12 periodically applies polling to the DSRC unit 18 after S18 until the navigation unit 19 writes uplink information in the DSRC unit 18. When it is determined that the user of the ITS vehicle-mounted device 17 is a member of the service enterpriser, in S20, the navigation unit 19 writes the uplink information in the DSRC unit 18. On the other hand, when the user is not a member, the navigation unit 19 performs nothing.

In S24, the server 12 transmits default contents (e.g., public service information) to the navigation unit 19 through the roadside device 11 and the DSRC unit 18. In S29, the server 12 applies memory access polling to the DSRC unit 18. When the user is a member, in response to the memory access polling, in S30, the DSRC unit 18 notifies the uplink information to the server 12.

In S33, the server 12 organizes, on the basis of member information acquired from the uplink information, accumulation-type contents suitable for member taste in the multi-contents format (FIG. 2) and distributes the accumulation-type contents to the ITS vehicle-mounted device 17. In S34, the server 12 notifies the end of the distribution of the accumulation-type contents. The vehicle 13 mounted with the ITS vehicle-mounted device 17 exits the communication area with the roadside device 11 according to the end of the distribution.

As shown in FIG. 9, in the center apparatus 30, the control unit 31 determines whether taste information included in the transmitted uplink information corresponds to a latest version (step S41). It is possible to determine on the basis of a version included in the taste information whether the taste information is the latest. When the taste information corresponds to the latest version (step S41; Y), the control unit 31 shifts to processing in step S51 explained later.

When the taste information does not correspond to the latest version (step S41; N), the control unit 31 generates setting information for setting taste information corresponding to the latest version and transmits the setting information to the vehicle-mounted device 17 via the communication unit 35 (step S42), The control unit 31 inputs, in a setting table, the number of items corresponding to the latest version, item numbers of the items, a text for display, and hierarchies besides information concerning the latest version and sets these kinds of information as setting information.

At this point, all flags may be set to a default value 0. Alternatively, it is also possible to collate the taste information with received taste information of an old version and set flags to 1 concerning items corresponding to items of the taste information of the old version among items of the latest version and set the taste information of the old version in advance. In this case, since setting content of the old version in the past can be reflected on the taste information corresponding to the latest version and it is unnecessary to set everything from the beginning on the vehicle-mounted device 17 side, convenience is high. Concerning items with high public nature in the taste information, a flag may be set to 1 as an initial value.

When the vehicle-mounted device 17 receives the setting information, the control unit 4 determines that a version of the taste information is updated and performs processing for notifying the user to that effect. For example, the control unit 4 generates a message screen or the like for notifying to that effect and causes the display unit 19e to display the message screen or the like (step S43).

On the other hand, in the center apparatus 30, when there is an item corresponding to the latest version in the taste information corresponding to the old version and content information can be organized by using the taste information of the old version, the control unit 31 performs organizing. For example, when there is a common item in the old version and the latest version, the control unit 31 organizes content information corresponding to the item. The control unit 31 transmits the organized content information to the vehicle-mounted device 17 (step S44). In the vehicle-mounted device 17, the control unit 4 causes the storage unit 19f to store the content information (step S45).

Subsequently, in the vehicle-mounted device 17, the control unit 4 causes, through display control, the display unit 19e to display an operation screen with which the user instructs presence or absence of setting concerning whether setting of taste information corresponding to the latest version is performed. Only when an instruction indicating that the setting is performed is input via the input unit 19d (step S46; Y), the control unit 4 causes the display unit 19e to display an operation screen for setting taste information corresponding to the latest version and causes the user to perform operation input.

In FIG. 10, an example of the operation screen is shown.

As shown in FIG. 10, the control unit 4 causes the display unit 19e to display items of the taste information corresponding to the latest version on an operation screen dl according to a hierarchical structure of the items. Specifically, the control unit 4 reads out the taste information in order of item numbers, causes the display unit 19e to display item names of the items in order of the item numbers using a text for display, and establishes the items in a hierarchical shape as shown in FIG. 10 on the basis of information concerning hierarchies. Specifically, an item in a hierarchy "0" is displayed on the left and subordinate items in hierarchies "1", "2", and the like are displayed in display positions further to the right as the hierarchies are lower.

Since a display area is limited, the items are pull-down displayed according to the hierarchical structure. First, the control unit 4 displays only a high-order item and causes the display unit 19e to pull-down display lower-order items subordinate to the item according to an instruction for pull-down display.

The control unit 4 causes the display unit 19e to display check boxes for the items. In the check boxes, the control unit 4 causes, according to the operation input of the user, the display unit 19e to display check marks indicating that items are items that the user desires to view. The control unit 4 may cause the user to separately operation-input check marks for the respective items. However, when the operation input is performed for the high-order item, the control unit 4 may automatically cause the display unit 19e to display the check mark assuming that operation input is performed for all the lower-order items subordinate to the item. In this case, when there is an item for which setting is unnecessary in the lower-order items, the user can release the setting by performing operation input for removing the checkmark. By adopting such a configuration, when there are a large number of items, it is possible to save labor and time of the user for performing operation input for each of the items.

When the operation input for setting ends, concerning the items of the setting information, the control unit 4 writes, according to the operation input of the user, flags indicating whether the user desires to view the items, forms taste information corresponding to the latest version, and writes the taste information in the uplink information storage area M (step S48). When the taste information of the old version is already written, the control unit 4 performs overwriting.

On the other hand, the center apparatus 30 periodically applies polling to the vehicle-mounted device 17 (step S47) and requests uplink information written in the uplink information storage area M. Therefore, when the taste information corresponding to the latest version is written in the uplink information storage area M in the vehicle-mounted device 17, the DSRC unit 18 transmits the taste information to the center apparatus 30 according to the polling (step S49). The center apparatus 30 cannot grasp when update of the taste information is performed. Therefore, while the vehicle-mounted device 17 is present in a mutual communication area Z, the center apparatus 30 periodically performs polling and checks presence or absence of taste information update in the uplink information storage area M.

When the control unit 4 does not perform setting of taste information corresponding to the latest version (step S46; N) and the vehicle-mounted device 17 exits the mutual communication area Z, the control unit 4 proceeds to step S54. Thereafter, the setting of taste information corresponding to the latest version is performed by the user as explained above and the taste information is written in the uplink information storage area as uplink information. When the vehicle-mounted device 17 enters the mutual communication area Z next time, the taste information is transmitted to the center apparatus 30. Therefore, when the vehicle-mounted device 17 enters the mutual communication area Z next time, since the taste information updated by the user is uplinked, the user can receive content information based on the taste information.

When the center apparatus 30 receives the taste information corresponding to the latest version, the control unit 31 performs, on the basis of the taste information, update of taste information of the user corresponding to the taste information among the taste information stored in the storage unit 34 (step S50). Subsequently, the control unit 31 performs organizing of content information of the latest version on the basis of the taste information corresponding to the latest version and other uplink information and transmits the content information to the vehicle-mounted device 17 (step S51). Specifically, the control unit 31 selects content information or the like classified into items set in the flag of "1" in the taste information among the content information stored in the storage unit 34. In the vehicle-mounted device 17, the control unit 4 stores the received content information in the storage unit 19ƒ (step S52).

Thereafter, when the center apparatus 30 distributes all kinds of content information that should be distributed, the control unit 31 generates message information for notifying the end of the distribution and transmits the message information to the vehicle-mounted device 17 (step S53). This message information of the end of the distribution is information for urging the user to perform area out. Thereafter, when communication with the roadside apparatus 15 is interrupted for a fixed time, the control unit 4 of the vehicle-mounted device 17 determines that the distribution is completed and performs control for deleting the uplink information when the distribution of the content information from the center apparatus 30 is interrupted (step S54). According to this control, the DSRC control unit 18a deletes the uplink information in the uplink information storage area M.

FIG. 11 shows an example of a taste data table transmitted from the roadside apparatus 15 to the ITS vehicle-mounted device 17. The taste data table is transmitted from the roadside apparatus 15 to the ITS vehicle-mounted device 17 in S18 in FIG. 4. There are one hundred twenty-eight items of the taste data table in total with data numbers 0 to 127. There are a text for display, a nest for display, a target identifier, a default value, and the like in association with each of the data numbers. The nest for display=0 means a top hierarchy. Larger numerical values indicate lower hierarchies. The target identifier is a flag indicating whether items of the data numbers are targets of presence or absence registration of taste by the user. As it is seen from FIG. 7 referred to later, the target identifiers=1, 0 respectively mean that items are a target and a non-target of presence or absence registration of taste by the user. The default values=0, 1 respectively mean that the user does not have taste and has taste concerning the items. In FIG. 11, default values of "foreign film" and "Japanese film" with the target identifier=1 are 0.

FIG. 12 is a taste data table generated in the ITS vehicle-mounted device 17 on the basis of the taste data table shown in FIG. 11. As it is seen from comparison with FIG. 11, classification is smaller as a value of the nest for display is larger. Only a display text with the target identifier=1 is a target of presence or absence registration of a taste by the user as taste data. In FIG. 6, the default values of both "foreign film" and "Japanese film" are 0. Therefore, in the first taste data, both "foreign film" and "Japanese film" are 0 (in an actual screen example, 0 is displayed in a square space without check). On the other hand, in FIG. 12, the user checks "foreign film" to indicate that the user has a taste in "foreign film" and the taste data=1. In FIG. 12, the user registers presence or absence of a taste concerning only an item in the bottom hierarchy. However, if the target identifier=1 is attached to an item in a higher hierarchy, presence or absence of a taste can also be registered for items in large classification and intermediate classification.

FIGS. 13A-13B are diagrams showing taste data tables of new and old versions in comparison. A taste data table in FIG. 13A is an old version and a taste data table in FIG. 13B is a new version. "Dohoku", "Donan", "Seio", and "Toh-o" in the old version are respectively revised to "Wakkanai", "Hakodate", "Western Europe", and "Eastern Europe" in the new version. The roadside apparatus 15 stores, with respect to the taste data table of the old version, for each of users, uplink information input by the user and received during last area in the storage device. Specifically, all of "Dohoku", "Donan", "Seio", and "Toh-o" of the old version shown in FIG. 13A are checked. The roadside apparatus 15 stores this user taste information in the storage device.

When the service enterpriser of the roadside apparatus 15 changes a version of a taste data table to be distributed, since both the old and new versions are created by the service enterpriser itself, the service enterpriser can determine revised items in the taste data table of the new version are the same as or similar to which items in the taste data table of the old version and whether user taste information of the old version can be inherited to the new version. "Similar" includes a case in which, although substantial content is the same, texts of a half-size font character and a full-size font character are different and a case in which notations of Chinese characters and hiragana are different. "Same" means complete identicalness of texts.

The roadside apparatus 15 includes a corresponding table used when there are items of the taste data table of the new version to which the user taste information of the items of the taste data table of the old version is inherited. An item correspondence relation between the taste data table of the new and old versions in the corresponding table is in a relation in which contents of items of the taste data table of the new and old versions are the same or similar. The corresponding table is usually common to all users. Specifically, item numbers of revised items of the taste data table of the new version are associated with item numbers of items of the taste data table of the old version corresponding to the revised items. In the example shown in FIGS. 13A-13B, in the corresponding table, item numbers "32", "33", "52", and "53" of the taste data table of the old version are associated with item numbers "32", "33", "52", and "53" of the taste data table of the new version. In this example, the numerical values of the corresponding numbers of the new and old taste data tables are the same. However, the numerical values may be different and, in general, are different.

The roadside apparatus 15 identifies, on the basis of a user ID included in uplink information, a user of the ITS vehicle-mounted device 17 at a transmitting destination of the uplink information. The roadside apparatus 15 searches through user taste information of the taste data table of the old version of the user and then sets, concerning the user, default values of item numbers of the new version as taste data of corresponding item number of the taste data table of the old version on the basis of the corresponding table. In the example shown in FIGS. 13A-13B, taste data of the items "Dohoku", "Donan", "Seio", and "Toh-o" of the old version are respectively "1", "1", "1", and "1". Therefore, the roadside apparatus 15 sets default values of "Wakkanai", "Hakodate", "Western Europe", and "Eastern Europe" respectively to "1", "1", "1", and "1".

FIG. 14 shows information after the roadside apparatus 15 arranges stop point information of the vehicle 13 received, while being included in uplink information, from the roadside apparatus 15 of the vehicle 13 during area in of the vehicle 13. In FIG. 14, "Autofronts", "OK do", and "Maruhachiya" are assumed to be names of a car equipment sales store, a rental video store, and a fishing tackle store. This vehicle 13 stopped at the stores the numbers of times shown in FIG. 14. The roadside apparatus 15 does not have to acquire information concerning times when the vehicle 13 stopped at the respective stop points last.

Actually, the roadside apparatus 15 does not learn specific names of these stop points from the uplink information and acquires stop point information of the uplink information from, for example, latitudes and longitudes. Therefore, the roadside apparatus 15 collates these latitudes and longitudes with map data and learns specific store names of the stop points.

FIG. 15 shows a relation between set stop points and taste data. The roadside apparatus 15 selects stores where the vehicle 13 stopped a predetermined number of times, for example, three or more times from the data shown in FIG. 14. In the case of FIG. 14, "Autofronts" and "Maruhachiya" are selected. The roadside apparatus 15 collates the latitudes and longitudes of the stop points acquired from the ITS vehicle-mounted device 17 with the map data of the roadside apparatus 15 itself and grasps whether points at the latitudes and longitudes are "Autofronts" and "Maruhachiya". The service enterpriser of the roadside apparatus 15 selects a word used as a text for display of the taste data table of the new version this time of the service enterpriser in relation to the selected stores.

In the default value setting of the new taste data table of the user at an information source shown in FIG. 14, the roadside apparatus 15 sets a default value of an item of the text for display same as the selected word in FIGS. 15 to "1", which means that the user has a taste. In this way, information of the taste data table attached with the default values is transmitted to the ITS vehicle-mounted device 17 of the user at the information source together with the version information. In the ITS vehicle-mounted device 17, the taste data table is displayed on the screen of the navigation unit 19. The user checks (indicating that the user has a taste) and removes checks (indicating that the user has no taste) concerning only items required to be changed while inputting nothing concerning items not required to be changed.

FIGS. 16A-16B show a display example of taste data tables of new and old versions displayed in the ITS vehicle-mounted device 17 when the roadside apparatus 15 transmits special information to the ITS vehicle-mounted device 17b concerning revised items in the taste data table of the new version. The taste data table shown in FIG. 16A is the old version and the taste data table shown in FIG. 16B is the new version. As explained in relation to FIGS. 13A-13B, the roadside apparatus 15 includes the item corresponding table for the old version and the new version concerning items of the taste data table of the new version inheriting, as default values, user taste information of the taste data table of the old version. In the example shown in FIGS. 16A-16B in the corresponding table, it is assumed that an item number 52 of "Sapporo/Muroran" of the new version is associated with an item number 52 of "Doh-o" of the old version and an item number 62, 63 of "England" and "France" of the new version is associated with an item number 62 of "Seio" of the old version.

The roadside apparatus 15 attaches, on the basis of the corresponding table, values of taste data of corresponding items of the taste data table of the old version to predetermined items of the taste data table of the new version and transmits, together with information of the taste data table of the new version, information for informing the user of the ITS vehicle-mounted device 17 which items are revised items in the taste data table of the new version. As a specific example, the roadside apparatus 15 inserts a specific text (e.g., *) in a specific place (e.g., top) in the text for display (see FIG. 9) of the taste data table (e.g., * England). The text for display of the taste data table corresponds to the respective items of the taste data table in a one-to-one relation. In the example shown in FIGS. 16A-16B, information indicating that item numbers 52, 62, and 63 of the taste data table of the new version are revised items is added to the information of the taste data table and transmitted from the roadside apparatus 15 to the ITS vehicle-mounted device 17.

On the other hand, concerning items in which the specific text is present in the specific place, the ITS vehicle-mounted device 17 deletes the specific text, displays only the remaining texts on the screen of the navigation unit 19, and displays texts of the items in which the specific text is inserted on the screen of the navigation unit 19 in colors or in italics. As a result, the user understands the revised items of the taste data table of the new version at a glance, concentratedly checks default values of the items, and performs maintenance or change of the taste data.

Figure 17:
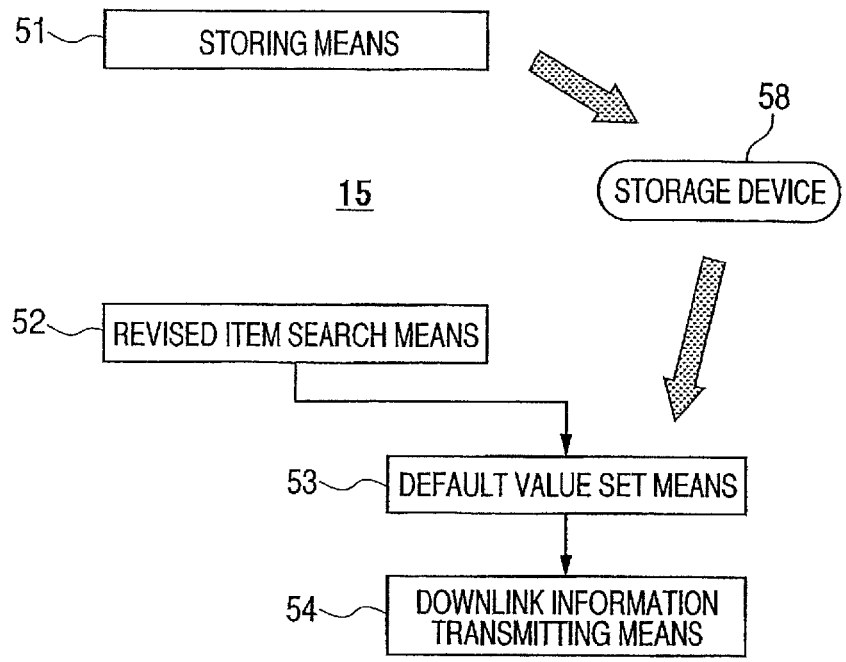
FIG. 17 is a block diagram of the roadside apparatus.

FIG. 17 is a block diagram of the roadside apparatus 15. The roadside apparatus 15 transmits information of a taste data table to a vehicle-mounted device, which enters a radio communication area, together with version information of the taste data table and receives uplink information including user taste information corresponding to the taste data table from the vehicle-mounted device. The roadside apparatus 15 is not limited to a roadside apparatus that transmits and receives data to and from the vehicle-mounted device in the DSRC. The roadside apparatus 15 includes storing means 51, revised item search means 52, default value set means 53, and downlink information transmitting means 54.

The storing means 51 causes a storage device 58 to store user taste information in a taste data table of an old version. The revised item search means 52 searches for items revised from the old version among items of the taste data table of the new version. The default value set means 53 sets, on the basis of a correspondence relation between items of the taste data table of the old version and items of the taste data table of the new version that inherits user taste information corresponding to the items of the taste data table of the old version, default values of the revised items of the taste data table of the new version in taste information of a new version transmitting-destination user of this time corresponding to correspondence items of the taste data table of the old version. The downlink information transmitting means 54 transmits, to the vehicle-mounted device, downlink information including information of the taste data table of the new version in which the default values are set.

Usually, a service enterpriser creates a taste data table. Therefore, the correspondence relation between the items of the taste data table of the old version and the items of the taste data table of the new version that inherits the user taste information is created by the service enterpriser without any trouble. The correspondence relation between the items of the taste data table of the old version and the items of the taste data table of the new version that inherits the user taste information may be common to all users. However, the correspondence relation can also be finely prepared for each of the users, for example, according to sex, age, or income group. The roadside apparatus 15 can grasp, according to a user ID received earlier, who a transmitting-destination user of the taste data table of the new version is. The user can receive, from the roadside apparatus 15, a taste data table in which default values conforming to taste information of the user input in the old version are set. Labor and time of input to the taste data table of the new version are reduced.

Preferably, the default value set means 53 sets, concerning revised items for which default values cannot be set from the correspondence relation, default values on the basis of uplink information. The default values are set on the basis of, for example, stop point information and information concerning a destination and way points included in the uplink information. This specific example is the example explained in relation to FIGS. 14 and 15.

Typically, the downlink information transmitting means 54 includes information indicating which items are revised items in the downlink information together with information of the taste data table of the new version and transmits the information. In the town car life navigation multi-contents format, the information indicating which items are revised items is inserted in, for example, the text for display of the taste data table. The vehicle-mounted device can identify the information and display texts of the revised items in a form for easily informing the user that the revision is made such as in colors or in italics.

Figure 18:
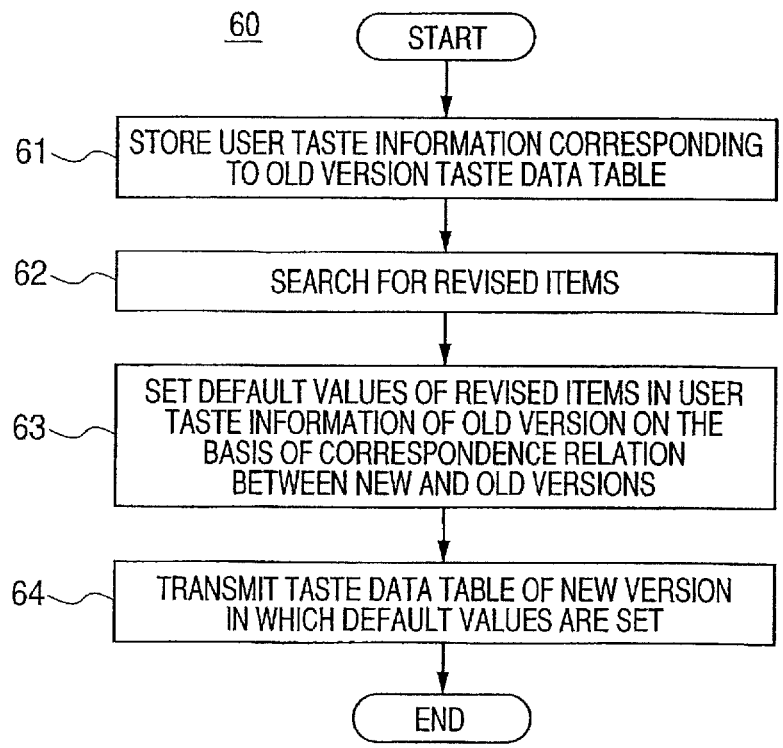
FIG. 18 is a flowchart of a roadside apparatus control method.

FIG. 18 is a flowchart of a roadside apparatus control method 60. The roadside apparatus control method 60 is applied to the roadside apparatus 50 (FIG. 17), In S61, the roadside apparatus 50 causes the storage device 58 to store user taste information corresponding to a taste data table of an old version. In S62, the roadside apparatus 50 searches for items revised from the old version among items of a taste data table of a new version. In S63, the roadside apparatus 50 sets, on the basis of a correspondence relation between items of the taste data table of the old version and items of the taste data table of the new version that inherits user taste information corresponding to the items of the taste data table of the old version, default values of the revised items of the taste data table of the new version in user taste information of correspondence items of the taste data table of the old version. In S64, the roadside apparatus 50 transmits, to the vehicle-mounted device, downlink information including information of the taste data table of the new version in which the default values are set.

The kinds of processing in S61 to S64 respectively correspond to functions of the storing means 51, the revised item search means 52, the default value set means 53, and the downlink information transmitting means 54 of the roadside apparatus 15 (FIG. 17). Therefore, the specific form explained concerning the functions of the storing means 51, the revised item search means 52, the default value set means 53, and the downlink information transmitting means 54 can also be applied as specific forms concerning the processing in S61 to S64.

A program to which the present invention is applied causes a computer to function as the means of the roadside apparatus 15. Another program to which the present invention causes the computer to executes the steps of the roadside apparatus control method 60.

As explained above, according to this embodiment, when the center apparatus 30 receives taste information from the vehicle-mounted device 17, the center apparatus 30 determines whether the taste information corresponds to the latest version. When the taste information does not correspond to the latest version, the center apparatus 30 generates setting information for setting taste information corresponding to the latest version and transmits the setting information to the vehicle-mounted device 17. The vehicle-mounted device 17 can easily perform setting of taste information corresponding to the latest version using the setting information. Therefore, it is possible to easily cope with version update of taste information.

When the center apparatus 30 transmits the setting information, the center apparatus 30 generates, concerning items corresponding to the latest version in the received taste information of an old version, setting information in which taste information of the old version of the old version is set in advance and transmits the setting information. Therefore, labor and time for setting taste information concerning all items in the vehicle-mounted device 17 one by one and convenience is high.

Even if the received taste information is the old version, if there is an item corresponding to the latest version, the center apparatus 30 transmits content information of the latest version corresponding to the item. Therefore, it is possible to distribute the content information as much as possible. When the vehicle-mounted device 17 sets taste information corresponding to the latest version anew and transmits the taste information to the center apparatus 30, the center apparatus 30 can organize content information corresponding to the taste information of the latest version and transmit the content information.

On the other hand, when the vehicle-mounted device 17 receives the setting information from the center apparatus 30, the vehicle-mounted device 17 notifies the user, through message display or the like, that a version is updated. Therefore, the user can easily grasp the version update. It is possible to perform setting of taste information corresponding to the latest version using the setting information. Therefore, it is possible to easily cope with the update of the version.

The vehicle-mounted device 17 displays an operation screen for instructing presence or absence of setting of taste information corresponding to the latest version and, only when it is instructed to set the taste information, displays an operation screen for the setting, performs setting of taste information according to operation input, and transmits the taste information to the center apparatus 30. Therefore, it is possible to perform operation input for setting of taste information according to convenience of the user.

In the operation screen for setting, items of the taste information having a hierarchical structure are established in a hierarchical shape. The user can easily grasp the structure of the items of the taste information and easily perform operation input for setting tastes.

This specification discloses inventions in various scopes and levels. Those inventions include not only the devices and the methods in the various technical scopes and the specific levels explained in this specification but also one or a plurality of elements extracted from the device and the methods that realize independent actions and effects within a scope obviousness of those skilled in the art, one or a plurality of elements changed in the scope of obviousness, and one or a plurality of elements, combinations of which are changed among the devices and among the methods.

What is claimed is:

1. A distribution system comprising:
    a vehicle-mounted device configured to provide user taste information indicating how a user chooses contents information from a distribution enterpriser previously registered as a member;
    a server configured to organize and distribute contents information on the basis of a taste data setting table for setting the user taste information for each of items of contents data; and
    a roadside apparatus configured to intervene between the vehicle-mounted device and the server, which operates to receive uplink information including the user taste information reflected on the taste data setting table from the vehicle-mounted device entering a wireless communication area and to transmit the uplink information to the server, while transmitting information for the taste data setting table and version information for the taste data setting table from the server to the vehicle-mounted device,
    wherein the vehicle-mounted device operates to transmit the uplink information through the roadside apparatus to the server, when the contents information is the contents information from the member-registered distribution enterpriser, wherein the server operates to decide whether the taste data setting table reflecting the user taste information from the vehicle-mounted device is of the latest version when having received the user taste information from the vehicle-mounted device, and when the taste data setting table reflecting the user taste information from the vehicle-mounted device is not of the latest version, the server operates to generate the latest version of the taste data setting table including all items of revised items and non-revised items to transmit the generated taste data setting table together with update information indicative of the table information to be updated to the vehicle-mounted device, and further the server operates to generate update information indicative of the information on an old version of the taste data setting table to be updated for items corresponding to the latest version in the received information on the old version of taste data setting table to transmit the generated update information to the vehicle-mounted device, and wherein the server operates to respond to the reception of the user taste information corresponding to the latest version of the taste data setting table from the vehicle-mounted device to edit contents information on the basis of the user taste information to transmit the edited contents information to the vehicle-mounted device.

2. The distribution system according to claim 1, wherein the server comprises:
a reserving unit configured to cause the user taste information for the old version of the taste data setting table to be reserved in a storage device;
a revised items searching unit configured to search items which have been revised from the old version in items in the latest version of the taste data setting table;
a default value setting unit configured to set a default value each of revised items of the latest version of the taste data setting table at user taste information a corresponding item of the taste data setting table on the basis of a correspondence relationship between items in the old version of taste data setting table and items in the latest version of the taste data setting table which inherits user taste information for the items of the old version; and
a transmission information transmitting unit configured to transmit transmission information including information with a default value on the latest version of the taste data setting table to the vehicle-mounted device.

3. The distribution system according to claim 2,
wherein the default value setting unit operates to set a default value on the basis of the uplink information as for each of revised items for which the default value has not been able to be set on the basis of the correspondence relationship.

4. The distribution system according to claim 2,
wherein the transmitting unit operates to transmit the transmission information including information indicating what is a revised item together with the information on the latest version of the taste data setting table.

5. A distribution system comprising:
a vehicle-mounted device configured to provide user taste information indicating how a user chooses contents information from a distribution enterpriser previously registered as a member;

a server configured to organize and distribute contents information on the basis of a taste data setting table for setting the user taste information for each of items of contents data; and
a roadside apparatus configured to intervene between the vehicle-mounted device and the server, which operates to receive uplink information including the user taste information reflected on the taste data setting table from the vehicle-mounted device entering a wireless communication area and to transmit the uplink information to the server, while transmitting information for the taste data setting table and version information for the taste data setting table from the server to the vehicle-mounted device, wherein the vehicle-mounted device operates to transmit the uplink information through the roadside apparatus to the server, when the contents information is the contents information from the member-registered distribution enterpriser, wherein the server operates to decide whether the taste data setting table reflecting the user taste information from the vehicle-mounted device is of the latest version when having received the user taste information from the vehicle-mounted device, and when the taste data setting table reflecting the user taste information from the vehicle-mounted device is not of the latest version, the server operates to generate the latest version of the taste data setting table including all items of revised items and non-revised items to transmit the generated taste data setting table together with update information indicative of the table information to be updated to the vehicle-mounted device, and further the server operates to generate update information indicative of the information on an old version of the taste data setting table to be updated for items corresponding to the latest version in the received information on the old version of taste data setting table to transmit the generated update information to the vehicle-mounted device, and wherein when the vehicle-mounted device receives the update information indicative of the information on the latest version of the taste data setting table from the server, the user is notified that the information of the version of the taste data setting table is updated.

6. The distribution system according to claim 5,
wherein the vehicle-mounted device comprises an input unit and a display unit,
wherein when receiving the update information from the server, the vehicle-mounted device operates to cause an operation screen to be displayed on the display unit,
wherein the operation screen indicates information on the latest version of the taste data setting table is to be updated on the basis of the received update information, only when it is instructed through the input unit to update the latest version of the taste data setting table, and
wherein the vehicle-mounted device operates to generate the information on the latest version of the taste data setting table in response to an operation input from the input unit to transmit the generated information to the server.

7. The distribution system according to claim 6,
wherein the update information is information to be used to classify a plurality of items in a hierarchical shape to update the information on the taste data setting table, and
wherein the vehicle-mounted device operates to establish the plurality of items in a hierarchical shape on the operation screen for updating the information in the taste data setting table.

* * * * *